(12) United States Patent
Yamasaki et al.

(10) Patent No.: US 12,047,669 B2
(45) Date of Patent: Jul. 23, 2024

(54) IMAGING APPARATUS

(71) Applicant: Panasonic Intellectual Property Management Co., Ltd., Osaka (JP)

(72) Inventors: Takaaki Yamasaki, Osaka (JP); Tomoaki Tsutsumi, Osaka (JP); Daisuke Baba, Osaka (JP); Kyosuke Osuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 62 days.

(21) Appl. No.: 18/082,081

(22) Filed: Dec. 15, 2022

(65) Prior Publication Data

US 2023/0209176 A1    Jun. 29, 2023

(30) Foreign Application Priority Data

Dec. 24, 2021   (JP) .................................. 2021-211131

(51) Int. Cl.
*H04N 23/62*  (2023.01)
*H04N 23/63*  (2023.01)

(52) U.S. Cl.
CPC ........... *H04N 23/62* (2023.01); *H04N 23/632* (2023.01); *H04N 23/633* (2023.01)

(58) Field of Classification Search
CPC .... H04N 9/8205; H04N 1/32128; H04N 5/77; H04N 5/907; H04N 2201/0084; H04N 2201/3242; H04N 2201/3259; H04N 2201/326; H04N 2101/00; H04N 9/8233; H04N 9/8227; H04N 9/8047; H04N 23/62;

(Continued)

(56) References Cited

U.S. PATENT DOCUMENTS 7,548,238 B2 *  6/2009  Berteig ................. G06T 17/005
                                                     345/428
7,751,644 B2 *  7/2010  Kuwata ..................... G06T 5/75
                                                      358/1.9

(Continued)

FOREIGN PATENT DOCUMENTS

JP    H06-189182 A    7/1994
JP    2007-221606 A   8/2007

(Continued)

*Primary Examiner* — Pritham D Prabhakher

(74) *Attorney, Agent, or Firm* — Renner, Otto, Boisselle & Sklar, LLP

(57) ABSTRACT

An imaging apparatus includes: an image sensor generating original image data; an image processor performing image processing to generate image data; a storage storing a plurality of first parameter sets and at least one second parameter set; and a user interface receiving a user operation combining a first parameter set with a second parameter set. Each of the plurality of first parameter sets defines the effect in the image processing. Each of the at least one second parameter set defines a correspondence before and after color information in an image is converted. Based on the user operation, the image processor: adjusts an image indicated by the original image data, using the first parameter set included in the combination designated by the user operation; and converts color information included in the image adjusted by the first parameter set, using the second parameter set included in the designated combination.

8 Claims, 9 Drawing Sheets

(58) Field of Classification Search
CPC .. H04N 23/632; H04N 23/633; H04N 23/631; H04N 23/617; H04N 23/60
USPC .................................................. 348/333.02
See application file for complete search history.

(56) References Cited

U.S. PATENT DOCUMENTS

| | | | | |
|---|---|---|---|---|
| 7,893,966 | B2* | 2/2011 | Yoshida | H04N 1/32128 |
| | | | | 348/222.1 |
| 7,924,472 | B2* | 4/2011 | Nakajima | H04N 1/32128 |
| | | | | 358/1.15 |
| 8,279,481 | B2* | 10/2012 | Nakajima | H04N 1/00973 |
| | | | | 358/1.9 |
| 8,421,885 | B2* | 4/2013 | Kameyama | H04N 19/17 |
| | | | | 386/242 |
| 8,559,044 | B2* | 10/2013 | Nakajima | H04N 1/00973 |
| | | | | 358/1.9 |
| 8,749,655 | B2* | 6/2014 | Yoshida | H04N 1/32128 |
| | | | | 348/222.1 |
| 9,398,212 | B2* | 7/2016 | Hikaru | H04N 23/815 |
| 10,027,903 | B2* | 7/2018 | Yim | H04N 1/00413 |
| 10,171,744 | B2* | 1/2019 | Kitajima | G06F 18/24 |
| 10,694,111 | B2* | 6/2020 | Kitajima | H04N 23/72 |
| 11,496,682 | B2* | 11/2022 | Tanabe | H04N 23/60 |
| 2007/0018980 | A1* | 1/2007 | Berteig | G06T 15/80 |
| | | | | 345/426 |
| 2008/0002035 | A1* | 1/2008 | Yoshida | G06F 21/10 |
| | | | | 348/222.1 |
| 2009/0009813 | A1* | 1/2009 | Nakajima | H04N 1/00973 |
| | | | | 358/302 |
| 2009/0167895 | A1 | 7/2009 | Hoshuyama et al. | |
| 2011/0102629 | A1* | 5/2011 | Yoshida | H04N 1/32128 |
| | | | | 348/222.1 |
| 2014/0147090 | A1* | 5/2014 | Kitajima | H04N 9/8042 |
| | | | | 386/224 |
| 2016/0142649 | A1* | 5/2016 | Yim | H04N 1/00413 |
| | | | | 348/239 |
| 2021/0037185 | A1* | 2/2021 | Tanabe | H04N 23/631 |

FOREIGN PATENT DOCUMENTS

| | | |
|---|---|---|
| JP | 2009-075398 A | 4/2009 |
| JP | 2009-159224 A | 7/2009 |
| JP | 2011-071708 A | 4/2011 |

* cited by examiner

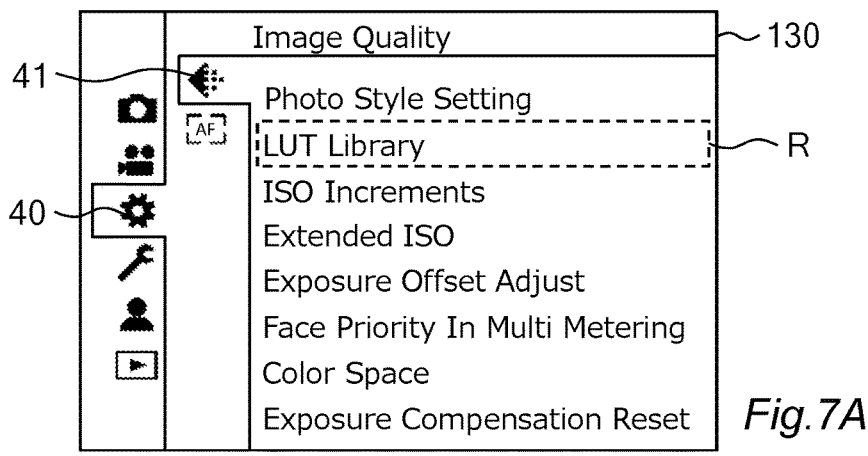
Fig.7A
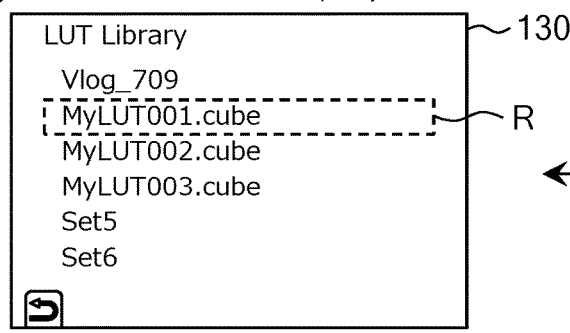
Fig.7B
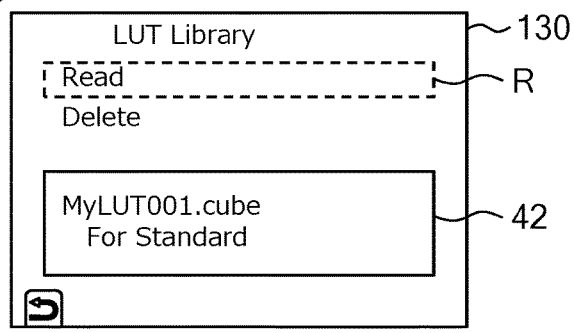
Fig.7C
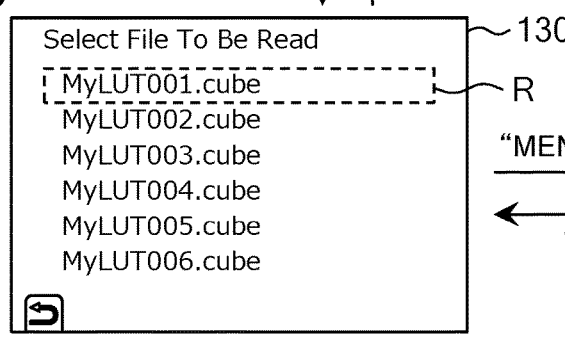
Fig.7D
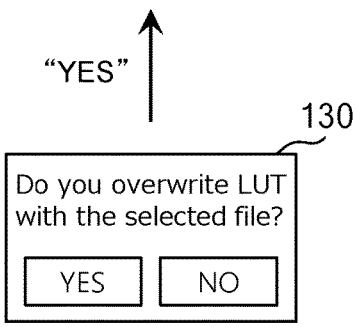
Fig.7E
Fig.7F
Fig.7G

IMAGING APPARATUS

BACKGROUND

Technical Field

The present disclosure relates to an imaging apparatus that performs image processing.

Related Art

JP 2007-221606 A discloses a system that sets parameters for image processing in an imaging apparatus and an information processing apparatus. The information processing apparatus and the imaging apparatus disclosed in JP 2007-221606 A can execute image processing using an image processing parameters obtained from one parameter file downloaded from an external apparatus. With this, it is intended to obtain an image processed with the image processing characteristics of the parameters.

SUMMARY

The present disclosure provides an imaging apparatus capable of easily obtaining an image subjected to image processing according to a user's idea.

An imaging apparatus according to one aspect of the present disclosure includes an image sensor, an image processor, a storage, and an user interface. The image sensor captures a subject image to generate original image data. The image processor performs image processing to generate image data, the image processing providing the original image data with a predetermined effect. The storage stores a plurality of first parameter sets and at least one second parameter set. Each of the plurality of first parameter sets defines the effect in the image processing. Each of the at least one second parameter set defines a correspondence before and after color information in an image is converted. The user interface receives a user operation combining a first parameter set of the plurality of first parameter sets with a second parameter set of the at least one second parameter set. Based on the user operation in the user interface, the image processor adjusts an image indicated by the original image data using the first parameter set included in a combination designated by the user operation, and converts color information included in the image adjusted by the first parameter set using the second parameter set included in the designated combination to generate the image data.

According to the imaging apparatus of the present disclosure, it is possible to easily obtain an image on which image processing is performed according to the user's idea.

BRIEF DESCRIPTION OF THE DRAWINGS

FIGS. 7A to 7G are schematic diagrams showing an example of a display screen for designating a candidate of a photo style to be combined with a LUT in a digital camera according to a second embodiment of the present disclosure;

DETAILED DESCRIPTION

First Embodiment

1. Configuration 1-1. Hardware Configuration

Figure 1:
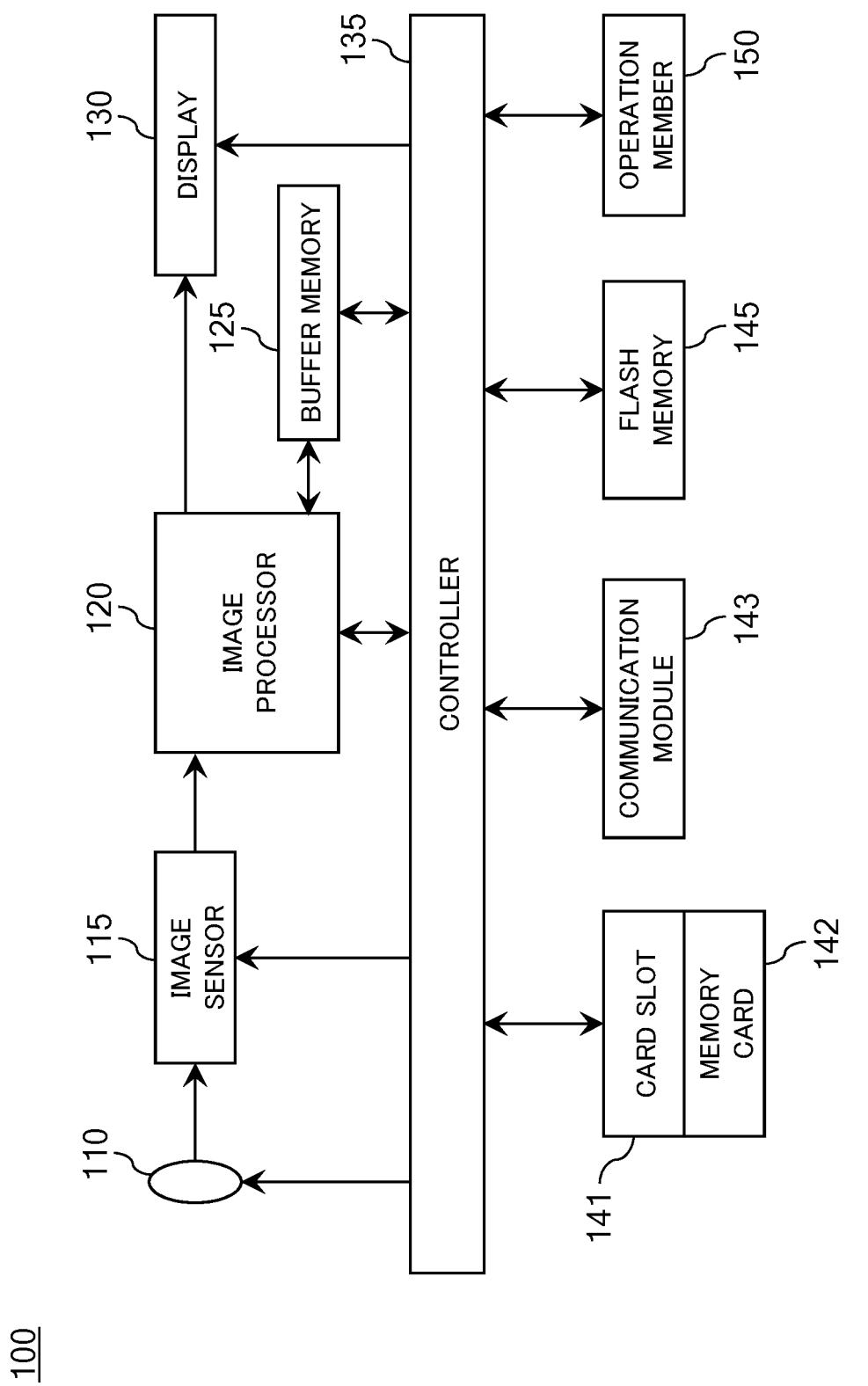
FIG. 1 is a diagram showing a configuration example of a digital camera according to a first embodiment of the present disclosure.

FIG. 1 is a diagram showing a configuration example of a digital camera 100 according to a first embodiment of the present disclosure. The digital camera 100 captures a subject image to generate image data. The image data generated by the digital camera 100 includes moving image data and still image data.

The digital camera 100 captures a subject image formed through an optical system 110 with image sensor 115 to generate original image data (RAW data). The image processor 120 performs various types of processing on the RAW data generated by the image sensor 115 to generate image data. The controller 135 records the image data generated in the image processor 120 in a flash memory 145 or a memory card 142 mounted on a card slot 141. The controller 135 can display (playback) the image data recorded in the flash memory 145 or the memory card 142 on the display 130 according to the operation of the operation member 150 by the user.

The optical system 110 includes a focus lens, a zoom lens, an optical image stabilization lens (OIS), a diaphragm, a shutter, and the like. The various lenses included in the optical system 110 may include any number of lenses or any number of groups.

The image sensor 115 captures a subject image formed through the optical system 110 to generate RAW data. The image sensor 115 generates image data on a new frame at a predetermined frame rate (for example, 30 frames/second). The generation timing of the RAW data and the electronic shutter operation in the image sensor 115 are controlled by the controller 135. It should be noted that, as the image sensor 115, various image sensors such as a CMOS image sensor, a CCD image sensor, or an NMOS image sensor may be used. The image sensor 115 is an example of an image sensor in the present embodiment.

The image processor 120 performs various types of processing on the RAW data output from the image sensor 115 to generate image data. In addition, the image processor 120 performs various types of processing on the image data read from the memory card 142 to generate an image for being displayed on the display 130. Examples of the various types of processing include white balance correction, gamma correction, YC conversion processing, electronic zoom processing, compression processing, decompression processing, and image processing using a lookup table (LUT), but are not limited to these. The image processor 120 may include a hard-wired electronic circuit or a microcomputer using programs.

The display 130 is a display apparatus such as a liquid crystal display or an organic EL display capable of displaying information. For example, the display 130 displays an image based on the image data processed by the image processor 120. In addition, the display 130 displays a menu screen for the user to check the setting of the digital camera 100.

The controller 135 integrally controls the entire operation of the digital camera 100. The controller 135 may include a processor configured to achieve a predetermined function by executing a program. That is, the controller 135 can be achieved by various processors such as a CPU, an MPU, a GPU, a DSU, an FPGA, and an ASIC. The controller 135 may include one or more processors. The controller 135 may include one semiconductor chip together with the image processor 120 and the like. Although not shown, the controller 135 incorporates a ROM. The ROM stores various programs such as autofocus control (AF control) executed by the controller 135. The controller 135 incorporates a RAM (not shown) that functions as a work area of the CPU.

The buffer memory 125 is a recording medium that functions as a work memory of the image processor 120 and the controller 135. The buffer memory 125 is achieved by a dynamic random access memory (DRAM) or the like.

The card slot 141 is detachably inserted with the memory card 142. The card slot 141 can be electrically and mechanically connected to the memory card 142. The memory card 142 is an external memory including a recording element such as a flash memory inside. The memory card 142 can store data such as a LUT and image data generated by the image processor 120.

The communication module 143 performs data communication according to an existing wired communication standard or wireless communication standard. For example, the digital camera 100 can communicate with a communication network such as the Internet and/or another apparatus or the like mounted with a Wi-Fi module via the communication module 143. The digital camera 100 may communicate directly with other apparatuses via the communication module 143, or may communicate via an access point.

The flash memory 145 is a non-volatile recording medium. The flash memory 145 can store various types of data such as a LUT, photo style setting information 10, LUT setting information 11, My Photo Style setting information 12, and image data to be described below.

The operation member 150 is a general term for a user interface such as a hardware key and a software key of the digital camera 100, and receives an operation by a user. The operation member 150 includes, for example, a button, a mode dial, a touch panel, and a switch. When receiving an operation by the user, the operation member 150 transmits an operation signal corresponding to the user operation to the controller 135.

The operation member 150 includes various buttons such as an information display switching (DISPLAY) button, a menu/set (MENU/SET) button, a return button, a decision button, and a cursor button. The cursor buttons include respective depression buttons corresponding to up, down, left, and right, and when the cursor buttons are depressed by the user, a selection area displayed on the display 130, a cursor, and the like can be moved. The operations by these various buttons may be configured to be executable not only by physical buttons but also by a touch panel.

1-2. Photo Style and LUT

The digital camera 100 has a plurality of image-shooting modes prepared in advance so that an image can be easily shot with a color tone and image quality preferred by the user. Hereinafter, this image-shooting mode is referred to as a "photo style". Furthermore, in the digital camera 100 of the present embodiment, for example, a LUT for color grading externally captured according to the user's preference can be combined and applied to each photo style.

Figure 2:
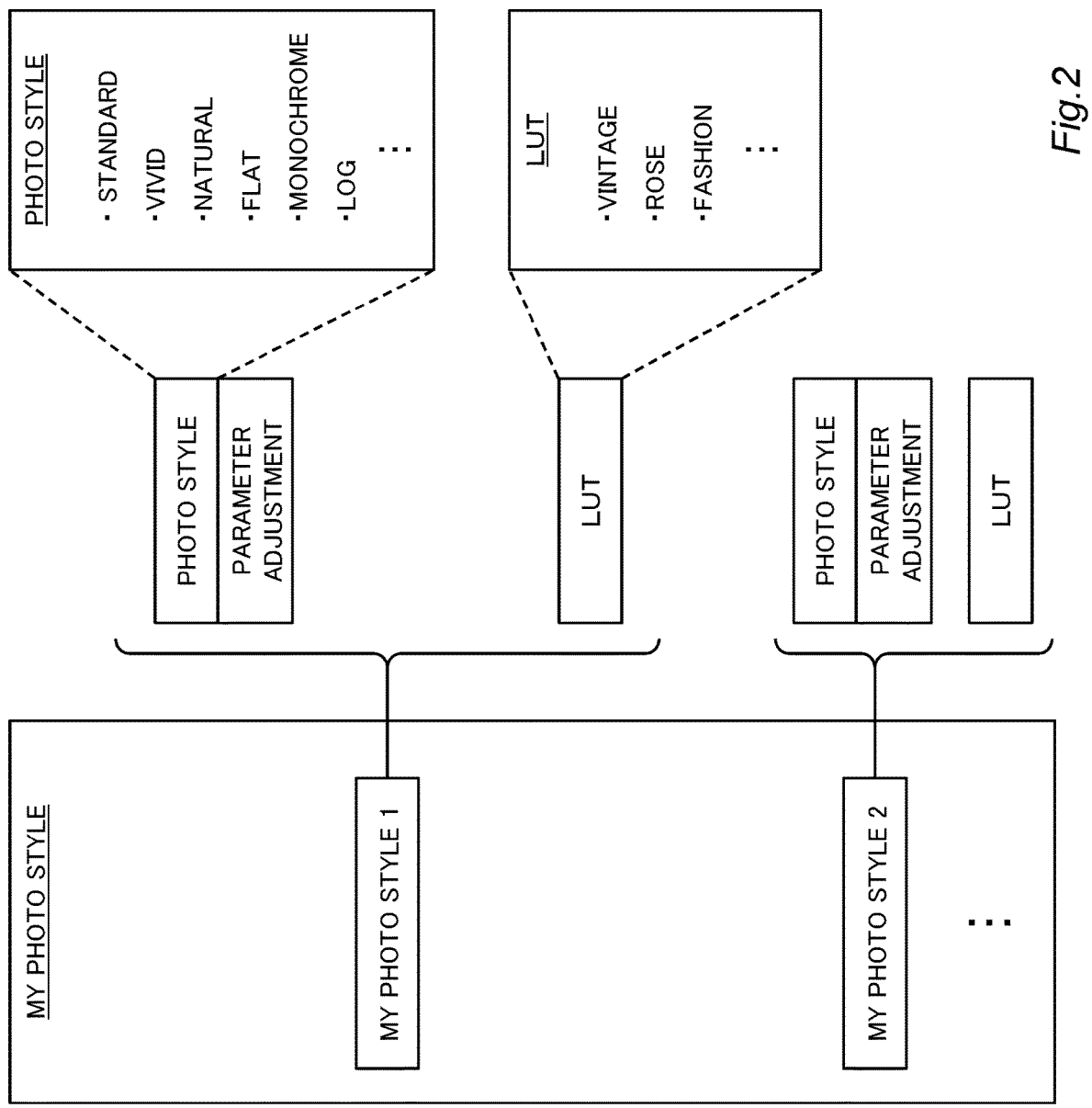
FIG. 2 is a diagram illustrating a photo style, a LUT, and a My Photo style.

For example, as shown in FIG. 2, in the digital camera 100, photo styles such as "standard", "vivid", "natural", "flat", "monochrome", and "Log" are prepared. The "standard" is a standard setting, and the "vivid" is a mode in which saturation and contrast are high and a vivid effect can be obtained. The "natural" is a mode in which contrast is low and a soft effect can be obtained. The "monochrome" is a mode for obtaining a monochromatic effect without a tint.

The "Log" is a mode for shooting an image using a logarithmic-curve-shaped gamma curve (hereinafter, "Log image") for widely utilizing a dynamic range by an imaging element, and is also referred to as Log gamma. The "flat" is a mode using a flat gamma curve instead of the Log gamma, and an effect such that exaggeration is suppressed can be obtained as compared with other photo styles.

LUTs currently circulating are generally created on the assumption of being applied to a Log image. The user can capture a LUT for a Log image into the digital camera 100 by, for example, acquiring the LUT on the Internet for free or purchasing the LUT from a seller such as an expert of image processing.

In the present embodiment, in order to avoid being bound by the fixed idea that a LUT applicable to the image data by the digital camera 100 must be for a Log image, an option in which the user combines various LUTs with various photo styles is provided.

For example, the user can create a LUT on the premise of a desired photo style among the "standard", "vivid", "natural", "flat", "monochrome", and the like, and store the LUT in the flash memory 145 via the memory card 142 or the like. Accordingly, for example, a LUT for a standard image can be applied to an image having the effect indicated by the photo style "standard", rather than a LUT for a Log image.

The digital camera 100 of the present embodiment has a degree of freedom not bound only to the above-described application. For example, the user can purposely combine another photo style such as "vivid" with a LUT created on the premise of the photo style "standard". Accordingly, for example, an Entry-level user can attempt whether an unexpectedly favorable effect for a given LUT can be achieved by combining the LUT with a photo style that is different from the photo style that was assumed to be combined with the LUT when the LUT was created, and the options of color grading can be widened in the digital camera 100.

1-2-1. My Photo Style

In the digital camera 100, when one photo style is selected, various parameters are set so that an image having an effect indicated by the photo style is generated. Specifically, values of the respective parameters of contrast, highlight, shadow, saturation, color tone, hue, filter effect, granularity, sharpness, and noise reduction are set for each photo style so as to obtain the effect indicated by the photo style. Thus, each photo style is configured as an image adjustment parameter set for adjusting the image indicated by the RAW data.

In the digital camera 100 of the present embodiment, a parameter such as contrast can be changed for each photo style and further in accordance with the user's preference. The setting (parameter change) obtained by changing the parameter of the photo style thus prepared in advance according to the user's preference can be registered in the digital camera 100 as "My Photo Style".

The digital camera 100 of the present embodiment can register a combination of a photo style and a LUT in this My Photo Style, for example.

In the My Photo Style, not only the above parameters such as contrast related to the photo style but also the parameters of the ISO sensitivity and the white balance may be set to values desired by the user.

The digital camera 100 of the present embodiment enables registration of a combination of a photo style and a LUT as a My Photo Style and use of the registered My Photo Style during or before image-shooting to be achieved by a simple user operation. By registering a plurality of My Photo Styles, it is possible to quickly select a My Photo Style corresponding to various scenes such as indoor, outdoor, day, and night, during or before image-shooting.

1-2-2. LUT

The digital camera 100 may store LUT(s) in advance in the flash memory 145. For example, the LUT is an array (parameter set) that defines a correspondence before and after color information for each pixel in the input image is converted. The LUT is, for example, a three-dimensional lookup table indicating a relationship between input and output color data including a combination of three colors of RGB. The image processor 120 performs image processing of converting the color of the input image data into the color of the output image data by referring to the LUT.

In the digital camera 100, for example, as shown in FIG. 2, names such as "vintage", "rose", and "fashion" can be set to a LUT in accordance with the tint of the output image data, the theme, the intention of the creator, and the like. The digital camera 100 manages each LUT by assigning an identifier (ID) so as to be identifiable from other LUTs, for example.

On attempting to create the user's own LUT, it is easier for the user to understand the effect of color correction if the user attempts to color correct from color tones, such as a standard, that are close to colors people perceive when looking at subjects with the naked eye than if the user attempts to color correct from color tones of a Log image that has low saturation and contrast. Therefore, as the user's own LUT is available in the digital camera 100, the user can easily create and use the LUT that matches his/her preference.

1-2-3. Data Structure

Figure 3:
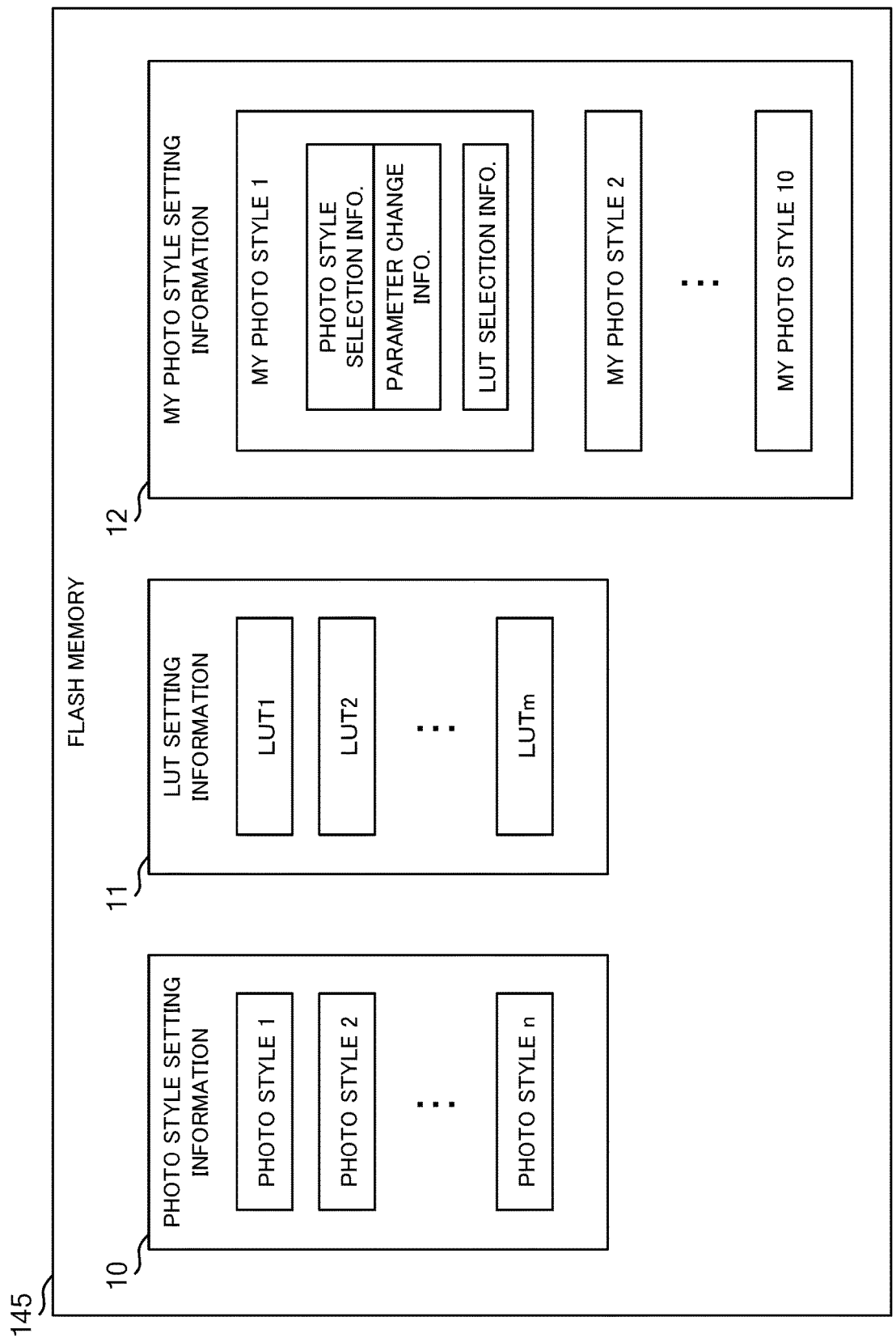
FIG. 3 is a diagram showing an example of a data structure stored in a flash memory of the digital camera according to the first embodiment.

FIG. 3 is a diagram showing an example of a data structure stored in the flash memory 145 of the digital camera 100 according to the present embodiment. In the flash memory 145 of the digital camera 100, the photo style, the LUT, and the My Photo Style are managed as photo style setting information 10, LUT setting information 11, and My Photo Style setting information 12, respectively.

In FIG. 3, the photo style setting information 10 includes setting information related to one or more (n) photo styles. The LUT setting information 11 includes setting information related to one or more (m) LUTs. The My Photo Style setting information 12 includes setting information related to 10 (an example and not limited thereto.) My Photo Styles.

As shown in FIG. 3, the setting information related to each My Photo Style in the My Photo Style setting information 12 includes photo style selection information, parameter change information obtained by changing the selected photo style according to the user's preference, and LUT selection information. The photo style selection information is selection information on which photo style among pieces of the photo style setting information 10 is to be registered in each My Photo Style. The LUT selection information is selection information on which LUT among pieces of the LUT setting information 11 is registered in each My Photo style.

2. Operation

Hereinafter, an operation of the digital camera 100 having the above configuration will be described.

2-1. Setting Operation of My Photo Style

In the digital camera 100, the setting and selection of My Photo Style being a combination of a photo style and a LUT as described above is configured to be easily performed by the user using the display 130 and the operation member 150. An example of a method for setting a My Photo Style in the digital camera 100 will be described with reference to FIGS. 4 and 5A to 5D.

Figure 4:
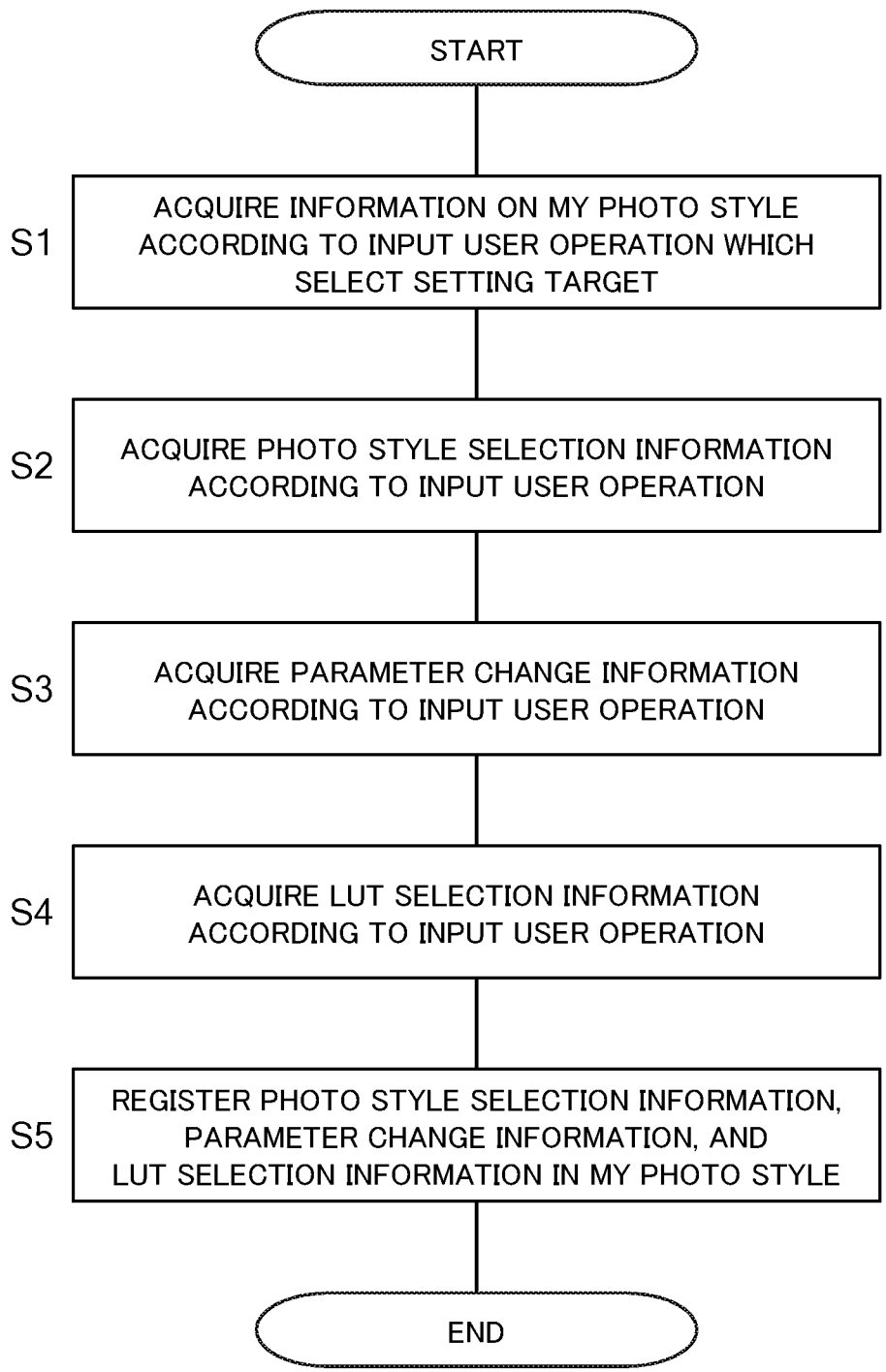
FIG. 4 is a flowchart for illustrating an example of a method for setting a My Photo Style in the digital camera according to the first embodiment.

FIG. 4 is a flowchart for illustrating an example of a method for setting a My Photo Style in the digital camera 100 according to the present embodiment. Each piece of processing shown in the flowchart in FIG. 4 is executed by the controller 135.

Figures 5A, 5B, 5C, 5D:
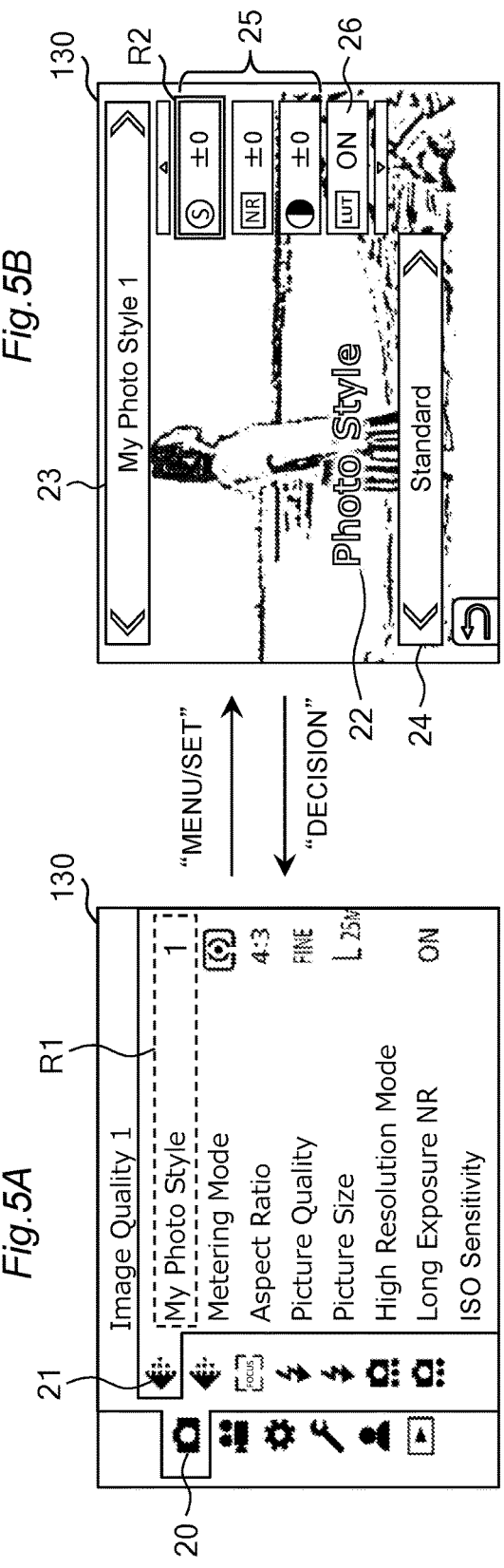
FIGS. 5A to 5D are schematic diagrams showing an example of display screens for setting a My Photo Style displayed on the display of the digital camera according to the first embodiment.

FIGS. 5A to 5D are schematic diagrams showing an example of a display screen displayed on the display 130 of the digital camera 100 in the method for setting the My Photo Style. FIG. 5A shows an example of a setting menu screen in the digital camera 100. FIG. 5B shows a setting screen of a photo style in the My Photo Style, and FIGS. 5C and 5D show setting screens of a LUT in the My Photo Style.

The setting menu screen shown in FIG. 5A shows a state in which the "photo" tab 20 being one of the main tabs is selected, and the "image quality 1" tab 21 being one of the sub tabs in the photo tab 20 is selected. The setting menu screen illustrated in FIG. 5A includes various menu items such as a My Photo Style menu. The selection region R1 is movable to select various menu items by a touch operation or the like, using a cursor button in the vertical direction or a touch panel. For example, when the user depresses the menu/set button with the selection region R1 aligned with the My Photo Style menu, the controller 135 causes the display screen to transition to the setting screen of the My Photo Style shown in FIG. 5B.

On the setting screen illustrated in FIG. 5B, in order to cause the user to select a photo style desired to be registered in a desired My Photo Style, for example, the controller 135 causes the display 130 to display temporary text 22 of "photo style" only for a predetermined period after the transition to FIG. 5B.

In the example in FIG. 5B, a My Photo Style display 23 for displaying the My Photo style to be set and a photo style selection menu 24 for selecting a photo style are displayed. In addition, in the example in FIG. 5B, a parameter display 25 for displaying the value of each parameter of the selected photo style and a LUT menu 26 indicating necessity or unnecessity of application of the LUT in the My Photo Style to be set are displayed.

In the example in FIG. 5B, the parameter display 25 includes, for example, values of various parameters of the photo style described above. The user can change the type of parameter to be displayed on the display 130 by depressing the cursor button in the vertical direction. The parameter display 25 may include imaging parameters such as ISO sensitivity and white balance.

In the example in FIG. 5B, a selection region R2 indicated by a double line is shown. By moving the selection region R2 onto the My Photo Style display 23 and depressing a cursor button in the left-right direction, the user can input, to the digital camera 100, an operation of selecting to which of the My Photo Style 1 to 10 the My Photo Style to be set should be set. At this time, the controller 135 acquires information on the selected My Photo Style as a setting target according to the input user operation (S1 in FIG. 4).

The user can input an operation of selecting a photo style to be registered in the My Photo Style to be set by moving the selection region R2 onto the photo style selection menu 24 and depressing the cursor button in the left-right direction. At this time, the controller 135 acquires photo style selection information indicating the photo style selected by the user operation (S2 in FIG. 4). In the display screen example in FIG. 5B, the photo style "standard" is selected.

When the photo style is selected, for example, an initial value of a parameter prepared in advance for the selected photo style is displayed in the parameter display 25. For example, the user can input an operation of changing the value of the sharpness by moving the selection region R2 to the shown position and depressing the cursor button in the left-right direction. Since the changed parameter is reflected on the image displayed on the display screen in FIG. 5B in real time, the user can change the parameter with checking the effect. In response to the user operation, the controller 135 acquires parameter change information indicating a parameter changed by the user operation (S3 in FIG. 4).

In the display screen example in FIG. 5B, when the selection region R2 is on the LUT menu 26 in accordance with the operation of the operation member 150 by the user, the controller 135 causes the display screen to transition to the LUT setting screen shown in FIG. 5C.

On the setting screen shown in FIG. 5C, the user can input an operation to select a LUT to be registered in the My Photo Style to be set. In order to show this, the controller 135 temporarily displays a temporary text 31 displaying "LUT" in the display screen example shown in FIG. 5C. In the example in FIG. 5C, a LUT selection menu 32 for selecting a LUT is displayed. For example, when the user depresses the information display switching button with the selection region R2 aligned with the LUT selection menu 32, the controller 135 causes the display screen to transition to the LUT selection screen shown in FIG. 5D.

On the selection screen shown in FIG. 5D, LUT files with file names such as "MyLUT001.cube" are listed. The user can input an operation of selecting a LUT to be registered in the My Photo Style to be set by moving the selection region R3 onto a desired LUT file and depressing a menu/set button. In response to this, the controller 135 acquires LUT selection information indicating the LUT selected by the user operation (S4 in FIG. 4).

At this time, the user can also select not to include the LUT ("No LUT" in FIG. 5D) in the My Photo Style to be set. When the menu/set button is depressed, the controller 135 causes the display screen to transition to the LUT setting screen shown in FIG. 5C.

The file name of the LUT selected in FIG. 5D is displayed on the LUT selection menu 32 in FIG. 5C. The user can input an operation of switching necessity or unnecessity (on/off) of application of the LUT in the My Photo Style to be selected by moving the selection region R2 onto the LUT selection menu 32 and then depressing the cursor button in the left-right direction.

When the LUT is switched on/off on the display screen in FIG. 5C, the selected LUT is also applied to the image displayed on the display screen in FIG. 5C and the image is subjected to color conversion. Accordingly, the user can check in real time whether the effect of the image processing by the My Photo Style to be set is as intended.

In FIG. 5B or 5C, when the decision button is depressed, the setting of the My Photo Style is completed, and the display screen transitions to the setting menu screen shown in FIG. 5A. When the decision button is depressed, the controller 135 associates the acquired photo style selection information, parameter change information, and LUT selection information with information on the My Photo Style to be set selected in FIG. 5B and registers them in the flash memory 145 (S5 in FIG. 4).

According to the setting method as described above, the My Photo style displayed on the My Photo Style display 23 when the decision button is depressed is used during or before image-shooting. The display screen example shown in FIG. 5A shows an example in which My Photo Style 1 is selected as the My Photo Style to be used during or before image-shooting.

As described above, by preparing in advance a My Photo Style in which a photo style and a LUT are combined, the user can quickly select the My Photo Style corresponding to various scenes during or before image-shooting.

In an apparatus that can use not only a LUT for a Log image but also a LUT and the like for a standard image, the number of combinations of the photo style and the LUT becomes large, and a certain LUT may be applied to a photo style not intended by the user. In the digital camera 100 of the present embodiment, by preparing a My Photo Style before capturing, it is possible to prevent a LUT from being applied to an unintended photo style, for example, a LUT for a Log image from being applied to a standard image.

2-2. Image-Shooting Operation

Figure 6:
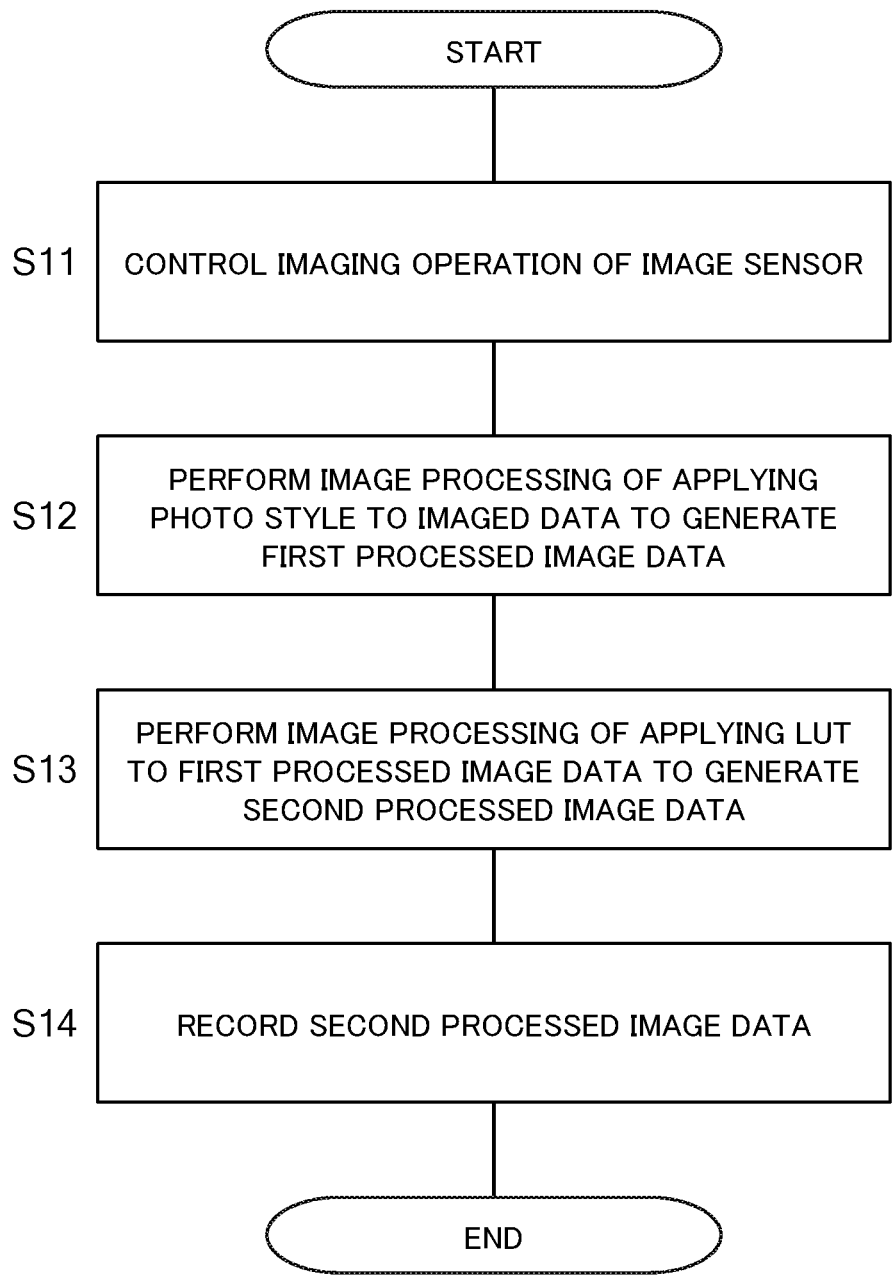
FIG. 6 is a flowchart for illustrating an example of an image-shooting operation in the digital camera according to the first embodiment.

In the digital camera 100 of the present embodiment, an example of an operation of shooting an image by applying the My Photo Style, set as described above, will be described with reference to FIG. 6. FIG. 6 is a flowchart for illustrating an example of an image shooting operation in the digital camera 100.

In FIG. 6, first, the controller 135 controls the image sensor 115 based on a user operation received by the operation member 150 such as a shutter button (S11). Under the control of the controller 135, the image sensor 115 captures a subject image formed through the optical system 110 to generate RAW data, and outputs the RAW data to the image processor 120.

Next, the image processor 120 performs image processing of adjusting the image shown by the RAW data using a photo style included in the preselected My Photo Style, and generates image data (hereinafter, referred to as "first processed image data") to which the photo style is applied as intermediate data (S12). When the parameter of the photo style has been changed in step S3 in FIG. 4, the image processor 120 applies the photo style whose parameter has been changed in step S3 to the image indicated by the RAW data.

Next, the image processor 120 applies the LUT included in the preselected My Photo Style to the first processed image data, and generates image data (second processed image data) to which the LUT is applied (S13). For example, the image processor 120 converts the color of the first processed image data as an input into the color of the output image for each pixel by referring to the LUT included in the preselected My Photo Style, and generates the second processed image data.

Next, the controller 135 records the second processed image data generated in step S13 as output image data in the memory card 142 via the card slot 141 (S14).

As described above, the digital camera 100 according to the present embodiment can output image data to which the photo style and the LUT are applied, and can output the LUT-applied image data as described above in real time.

Unlike the RAW data, the LUT-applied image data output by the digital camera 100 can be easily viewed and used by a general-purpose device such as a PC or a smartphone. As described above, according to the digital camera 100, since an external device such as a PC is not required to apply the LUT, the workflow for generating the LUT-applied image data can be made efficient.

As described above, since the photo style and the LUT combined in the preselected My Photo Style are applied to the RAW data obtained by the image-shooting operation, the digital camera 100 can prevent the LUT from being applied to a photo style not intended by the user.

In the My Photo Style, various LUTs can be combined with various photo styles, not limited to the LUT for the Log image in particular. The photo style "Log" is generally used together with the setting with high ISO sensitivity, such as ISO 640, for example, from the viewpoint of appropriately obtaining a wide dynamic range. When the setting with high ISO sensitivity is used, it is not possible to photograph at a bright scene with the diaphragm opened. In contrast to this, in the digital camera 100, the user can select a photo style intended to photograph at a bright scene with the diaphragm opened. For example, the user can photograph with the diaphragm opened at a bright scene using "standard" as a photo style suitable for use together with the setting with relatively low ISO sensitivity, such as ISO 100. As described above, the digital camera 100 provides a wide range of options for the user to perform various settings such as ISO sensitivity during or before image-shooting.

3. Effects and the Like

As described above, the digital camera 100 being an example of the imaging apparatus according to the present embodiment includes an image sensor 115 being an example of the image sensor, an image processor 120, a flash memory 145 being an example of the storage, and an operation member 150. The image sensor 115 captures a subject image and generates RAW data. The image processor 120 performs image processing to generate image data. The image processing provides the original image data with a predetermined effect. The flash memory 145 stores a plurality of photo styles (an example of a first parameter set) and at least one LUT (an example of a second parameter set). Each of the plurality of photo styles defines a predetermined effect in the image processing. Each of the at least one LUT defines a correspondence between before and after color information in an image is converted. The operation member 150 receives a user operation designating a My Photo Style being an example of a combination of one of the plurality of photo styles and one of the at least one LUT. The image processor 120 adjusts the image indicated by the RAW data using the photo style included in the My Photo Style designated by the user operation based on the user operation in the operation member (S12). The image processor 120 converts the color information included in the image adjusted with the photo style using the LUT included in the designated My Photo Style to generate image data (S13).

With this configuration, it is possible to designate a combination of a photo style and a LUT as a My Photo Style based on an operation by the user, and obtain an image having color information according to the user's idea using the My Photo Style for image processing. In addition, by preparing the My Photo Style in advance, the digital camera 100 can prevent the LUT from being applied to an unintended photo style and can prevent the image data to be generated from failing to have the finish corresponding to the user's idea.

The digital camera 100 includes a card slot 141 or a communication module 143 being an example of an input interface capable of acquiring information from the outside. The LUT may be stored in advance in the flash memory 145, or may be acquired from the outside via the card slot 141 or the communication module 143 and stored in the flash memory 145.

With this configuration, the digital camera 100 can acquire the LUT created by the user, the LUT purchased from a seller such as an image processing professional, and the like from the outside, and can obtain an image more suitable for the user's idea.

The flash memory 145 may store a plurality of My Photo Styles designated by the user operation. In this case, the operation member 150 receives an operation by the user selecting one of the plurality of My Photo Styles (S1). When one of the plurality of combinations is preselected before capturing the RAW data by the operation by the user received by the operation member 150, the image processor 120 performs image processing on the RAW data using the photo style of the preselected My Photo Style to generate first processed image data, and performs image processing on the first processed image data using the LUT of the preselected My Photo Style to generate image data.

By registering a plurality of My Photo Styles, it is possible to quickly select a My Photo Style corresponding to various scenes such as indoor, outdoor, day, and night, during or before image-shooting.

The plurality of parameters constituting the photo style included in the My Photo Style may each be changeable by a user's operation received via the operation member 150 (S3).

With this configuration, it is possible to change the parameter corresponding to the intention of the user, and it is possible to obtain an image more suitable for the user's idea.

The digital camera 100 may further include a recorder that records image data in the memory card 142 via the card slot 141 being an example of the recorder.

With this configuration, the image data to which the photo style and the LUT are applied is recorded in the flash memory 145, and can be easily used in a general-purpose device such as a PC or a smartphone, unlike the RAW data. Since an external apparatus such as a PC is not used for application of the LUT, improvement in efficiency of the workflow can be achieved.

Second Embodiment

In the first embodiment, a digital camera 100 has been described in which the information on the combination of the photo style and the LUT is recorded as My Photo Style, and the photo style and the LUT included in the My Photo Style selected by the user are applied to the RAW data. In the second embodiment, a warning function of displaying a warning message when a LUT not adapting to a photo style is combined with the photo style in the My Photo Style will be described.

In the digital camera 100 according to the present embodiment, in order to achieve the above-described warning function, it is possible to designate, to a LUT, a candidate of a photo style to be combined with the LUT. FIGS. 7A to 7E are schematic diagrams showing an example of a display screen for designating, to a LUT, candidates for a photo style to be combined with the LUT.

The setting menu screen shown in FIG. 7A shows a state in which the "custom" tab 40 being one of the main tabs is selected, and the "image quality" tab 41 being one of the sub tabs in the custom tab 40 is selected. For example, when the user depresses the menu/set button in a state in which the selection region R is adjusted on the LUT library menu, the controller 135 causes the display screen to transition to the list screen of the LUT library shown in FIG. 7B.

The LUT stored in the flash memory 145 is displayed on the list screen illustrated in FIG. 7B. The LUT stored in the flash memory 145 can be selected on the LUT selection screen in FIG. 5D.

In FIG. 7B, when the user moves the selection region R, selects one of the LUT storage fields, and depresses the menu/set button, the controller 135 causes the display screen to transition to the selection screen shown in FIG. 7C.

In the example in FIG. 7C, when the LUT is already stored in the LUT storage field selected in FIG. 7B, the combination candidate display 42 is displayed. In the combination candidate display 42, the LUT name stored in the LUT storage field selected in FIG. 7B and the photo style name designated in advance as a candidate of the photo style to be combined with the LUT are displayed. In the combination candidate display 42 in FIG. 7C, it is displayed that "MyLUT001.cube" is the LUT for the photo style "standard".

In the example in FIG. 7C, the user can select whether to read the LUT from the outside into the LUT storage field selected in FIG. 7B or to erase the LUT in the LUT storage field. In the example in FIG. 7C, when the user moves the selection region R, selects "read", and depresses the menu/set button, the controller 135 causes the display screen to transition to the selection screen of the LUT to be read shown in FIG. 7D.

In the example in FIG. 7D, the user can move the selection region R, select the LUT to be read, and depress the menu/set button. At this time, when the LUT has already been stored in the LUT storage field selected in FIG. 7B, the controller 135 causes the display 130 to display the confirmation screen shown in FIG. 7E. On the other hand, when the LUT is not stored in the LUT storage field selected in FIG. 7B, the controller 135 causes the display screen to transition to the combination candidate selection screen shown in FIG. 7F.

On the confirmation screen in FIG. 7E, the user can input an operation of selecting whether or not to overwrite the LUT already stored in the LUT storage field selected in FIG. 7B with the LUT selected in FIG. 7D. In the example in FIG. 7E, when "Yes" is selected by the user operation, the controller 135 causes the display screen to transition to the combination candidate selection screen shown in FIG. 7F, and when "No" is selected, the controller 135 causes the display screen to transition to the selection screen in FIG. 7D.

In the example in FIG. 7F, the user can input an operation of selecting which photo style the LUT to be read selected in FIG. 7D is a LUT for. That is, the user can select a candidate of a photo style to be combined with the LUT to be read selected in FIG. 7D.

In FIG. 7F, when the user moves the selection region R, selects a candidate of a photo style to be combined with the LUT to be read, and depresses a menu/set button, the controller 135 causes the display 130 to display a read completion message illustrated in FIG. 7G. Thereafter, when the predetermined period has elapsed, the controller 135 causes the display screen to transition to the list screen of the LUT library in FIG. 7B.

As described above, the user can designate, to a LUT, a candidate of a photo style to be combined with the LUT. When the designation by the user is performed, the controller 135 records, in the flash memory 145, information indicating a candidate of a photo style to be combined with the LUT as information accompanying the LUT selected in FIG. 7D.

Figure 8:
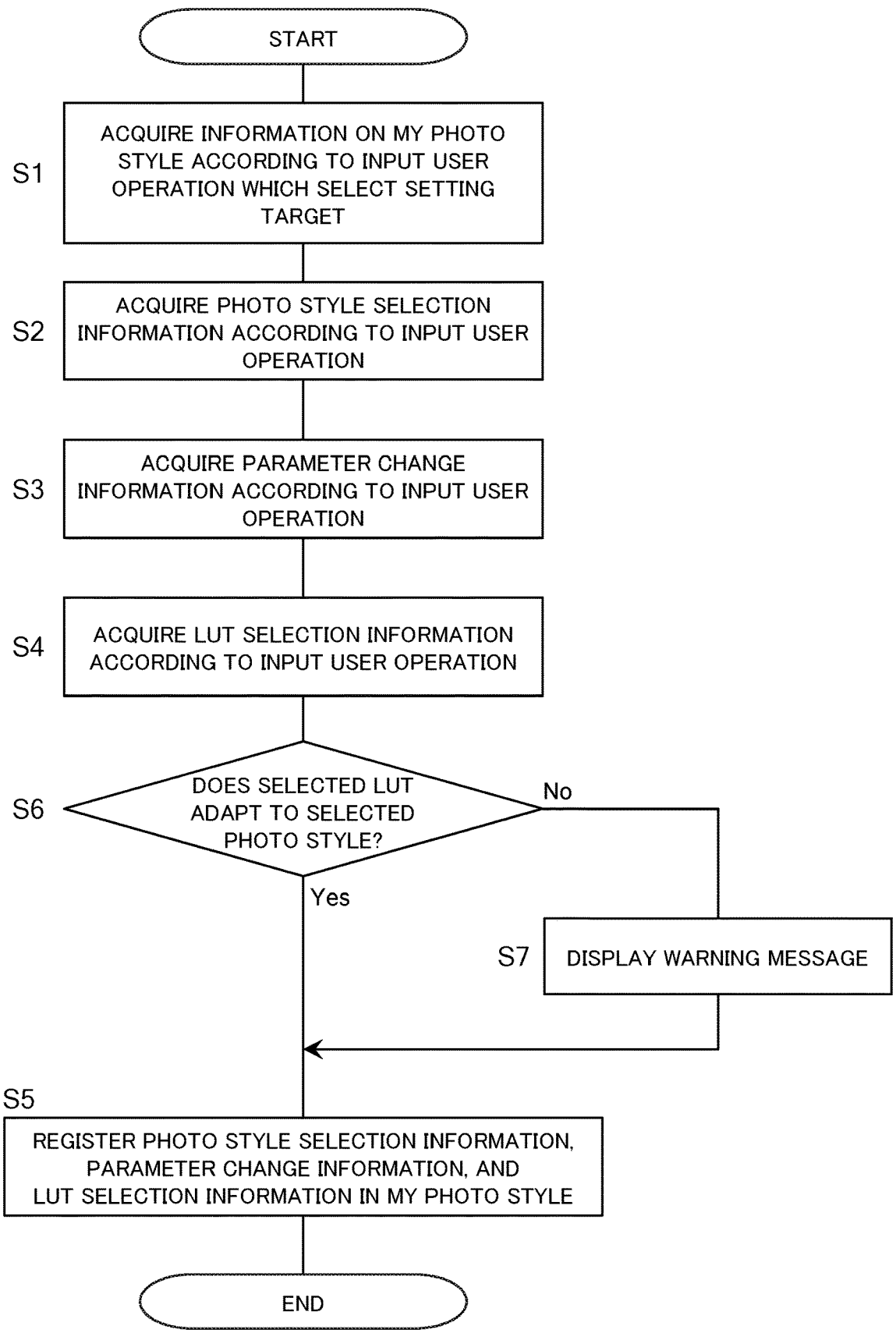
FIG. 8 is a flowchart for illustrating an example of a method for setting a My Photo Style in the digital camera according to the second embodiment.

FIG. 8 is a flowchart for illustrating an example of a method for setting a My Photo Style in the digital camera 100 according to the present embodiment. In the present embodiment, the controller 135 of the digital camera 100 performs steps S1 to S5 (FIG. 4) similarly to the first embodiment, and further performs processing of steps S6 and S7 as shown in FIG. 8.

In step S6 in FIG. 8, the controller 135 determines whether the LUT indicated by the LUT selection information acquired in step S4 adapts to the photo style indicated by the photo style selection information acquired in step S2. A case to be determined not to adapt in step S6 is when the candidate of the photo style to be combined with the LUT recorded in advance in the flash memory 145 is different from the photo style indicated by the photo style selection information acquired in step S2, for example. An example of the different case is a case where, although the photo style "standard" is selected in step S2, a LUT not a LUT for standard, for example, a LUT for Log is selected in step S4.

If determining in step S6 that the LUT indicated by the LUT selection information acquired in step S4 does not adapt to the photo style indicated by the photo style selection information acquired in step S2 (No in S6), the controller 135 proceeds to step S7. In step S7, the controller 135 displays a warning message indicating that the LUT does not adapt to the photo style on the display 130 (see FIG. 9D described below). Accordingly, the user can reselect the LUT to be registered in the My Photo Style, for example, and create the My Photo Style by combining the photo style and the LUT adapted to the photo style.

FIGS. 9A to 9D are schematic diagrams showing an example of display screens for setting a My Photo Style displayed on the display 130 of the digital camera 100 according to the present embodiment. In the following illustration of FIGS. 9A to 9D, illustration overlapping with the illustration of FIGS. 5A to 5D of the first embodiment is omitted.

Figure 9A:
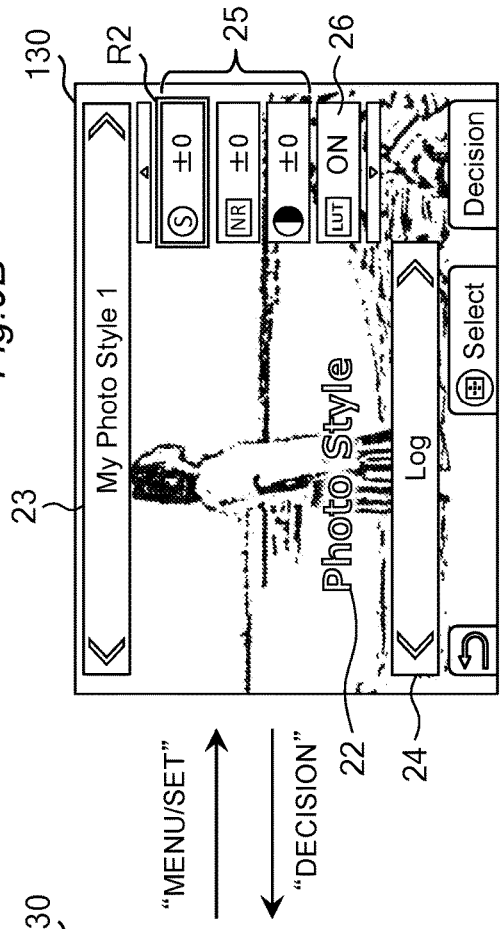
FIGS. 9A to 9D are schematic diagrams showing an example of display screens for setting a My Photo Style displayed on the display of the digital camera according to the second embodiment.
Figure 9B:
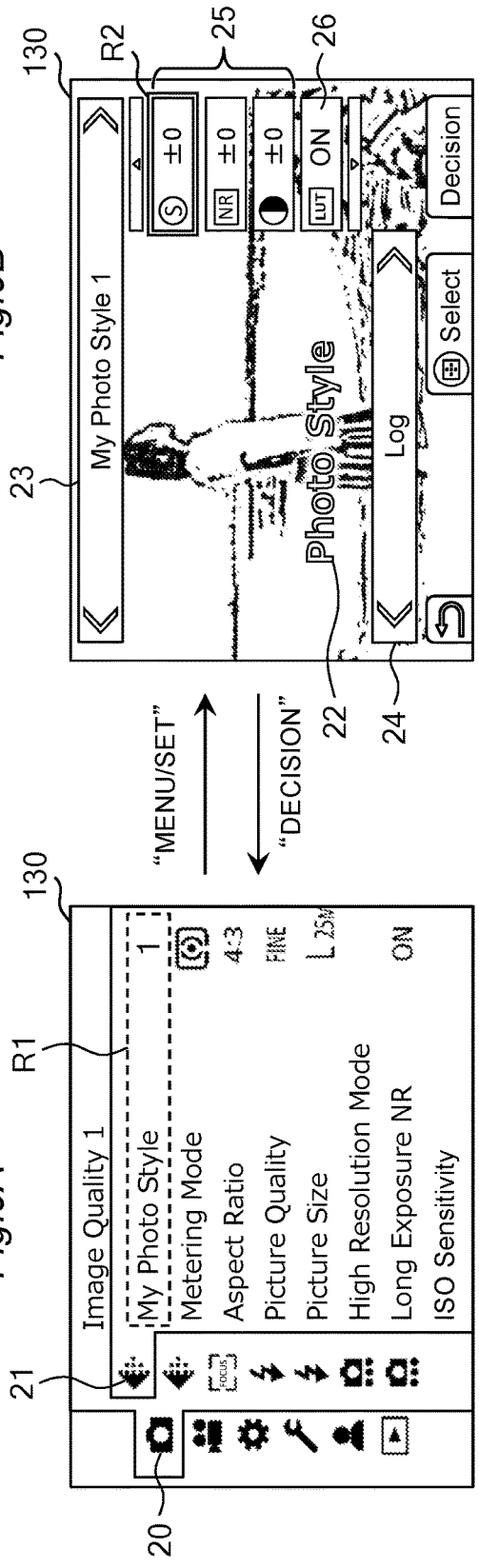
Figure 9C:
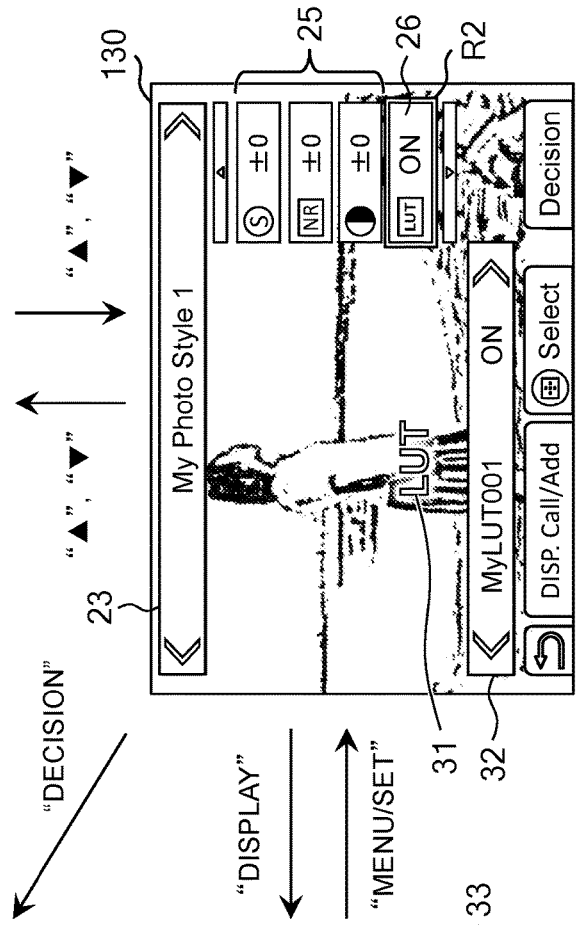
Figure 9D:
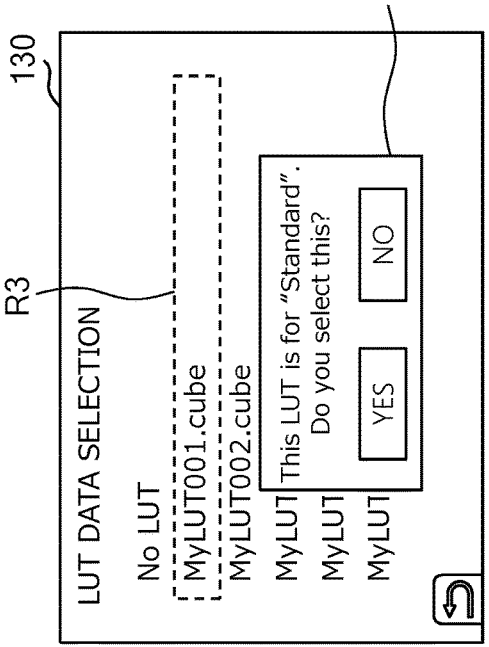

On the LUT selection screen shown in FIG. 9D, the user selects a LUT to be registered in the My Photo Style to be set (corresponding to S4 in FIG. 8) by moving the selection region R3 onto a desired LUT file and depressing the menu/set button. In FIG. 9D, the selection region R3 is on the LUT named "MyLUT001.cube". In the display screen example in FIG. 9B, the photo style "Log" is selected. When the LUT "MyLUT001.cube" is a LUT for "standard" but not a LUT for "Log", the controller 135 determines that the LUT "MyLUT001.cube" does not adapt to the photo style "Log". Therefore, when the menu/set button is depressed in the state in FIG. 9D, the controller 135 causes the display 130 to display a warning message 33 such as "This LUT is for "standard". Do you select this?" (S7 in FIG. 8).

For example, when the user selects "Yes" in the state in FIG. 9D, the LUT to be registered in the My Photo Style to be set is decided to be "MyLUT001.cube", and the display screen transitions to the setting screen in FIG. 9C. When the user selects "No" in the state in FIG. 9D, the display screen remains as in FIG. 9D (FIG. 5D), and the user can reselect the LUT.

As described above, in the digital camera 100 according to the present embodiment, it is possible to designate a candidate of a photo style to be combined with the LUT to be read. Accordingly, when the LUT selected in the My Photo Style to be set is combined with a photo style different from the candidate of the photo style for the LUT, the warning message can be displayed on the display 130.

In an apparatus that can use not only a LUT for a Log image but also LUTs such as LUTs for a standard image, the number of combinations of photo styles and the LUTs becomes large, and a certain LUT may be applied to a photo style not intended by the user. For example, when the LUT for the Log image is applied to the standard image, the image data to be generated may not have the finish corresponding to the user's idea. The digital camera 100 according to the present embodiment displays which photo style the LUT is for. Alternatively, the digital camera 100 according to the present embodiment displays the warning message when the LUT not adapting to a photo style in the My Photo Style is combined with the photo style.

Accordingly, the user can have an opportunity to determine whether or not the combination of the photo style and the LUT is as the user intended. When the user notices, by the warning message, that the combination is not as the user intended, the user can reselect the photo style and/or the LUT. As described above, the digital camera 100 according to the present embodiment can prevent the image data to be generated from failing to have the finish corresponding to the user's idea.

On the other hand, as shown in FIG. 9D, even when the candidate of the photo style to be combined with the LUT is different from the photo style indicated by the photo style selection information acquired in step S2, the user can select the two of "Yes" and "No". When the user intentionally selects "Yes", the controller 135 combines the LUT with the photo style indicated by the photo style selection information acquired in step S2 to form a My Photo Style.

As described above, in the present embodiment, not only the combination of the preset photo style and the LUT but also, for example, the combination of the LUT created on the premise of the photo style "standard" and another photo style such as "vivid" can be intentionally made by the user. Accordingly, for example, the user can be allowed to attempt a photo style different from the premise at the time of creating the LUT, and the options of color grading can be easily expanded in the digital camera 100.

As described above, in the digital camera 100 according to the present embodiment, the operation member 150 may receive a user operation for designating, to the LUT, a candidate of a photo style to be combined with the LUT. In this case, the flash memory 145 stores a candidate designated by a user operation. When displaying information related to the LUT, the display 130 displays the information indicating a candidate of a photo style to be combined with the LUT.

With this configuration, in the My Photo Style, it is possible to reduce a possibility that a certain LUT and a photo style different from a candidate of a photo style to be combined with the LUT are combined, and to prevent the image data to be generated from failing to have the finish corresponding to the user's idea.

Other Embodiments

As described above, the embodiments are described as the exemplification of the technique in the present disclosure. However, the technique in the present disclosure is not limited thereto, and can also be applied to embodiments in which changes, substitutions, additions, omissions, and the like are made as appropriate. In addition, it is also possible to combine each component described in the above embodiments to form a new embodiment. Thus, in the following, other embodiments will be exemplified.

In the first embodiment, an imaging operation example has been described in which a photo style and a LUT of a My Photo Style are applied (S12 and S13) to the RAW data (S11 in FIG. 6) obtained by capturing a subject image, and image data after the application is recorded (S14). However, the method for generating image data in the present disclosure is not limited thereto.

For example, the controller 135 of the digital camera 100 can record the RAW data obtained by capturing a subject image in the flash memory 145. The digital camera 100 can apply the photo style and the LUT of the My Photo Style to the existing RAW data obtained as described above, and record the image data after the application in the memory card 142. As described above, with the digital camera 100, the user can attempt to apply various photo styles and LUTs to the RAW data after capturing, and can obtain image data more suitable for the user's preference.

In the first embodiment, an example in which the image data generated in step S13 in FIG. 6 is recorded in the memory card 142 has been described. However, the present embodiment is not limited thereto. For example, the controller 135 may transmit the image data generated in step S13 to an external apparatus such as a server apparatus via the communication module 143 being an example of the communication interface. Since the image data may be moving image data, the user can perform live video distribution, WEB conference, and the like using a unique video to which a photo style and a LUT are applied, for example.

In each of the above embodiments, a three-dimensional lookup table indicating the relationship between the input and output color data including a combination of three colors of RGB has been described as an example of the LUT. However, the LUT has only to be an array (parameter set) that defines a correspondence before and after color information for each pixel in the input image is converted, and is not limited to a table having output color data corresponding one-to-one to any input color data. For example, when the input color data is not registered in the LUT as an input value, the image processor 120 estimates the output color data by a known estimation method such as tetrahedral interpolation. As described above, the LUT may include a mathematical formula defining how to adjust the color information on each pixel of the input image data and form the color information of the pixel of the output image data. Alternatively, the LUT may not include the table as described above, and may be represented only by the mathematical formula as described above. The LUT is not limited to the three-dimensional lookup table, and may be a one-dimensional lookup table.

In each of the above embodiments, a digital camera is described as an example of an imaging apparatus, but the present invention is not limited to this. The imaging apparatus of the present disclosure has only to be an electronic apparatus having an image capturing function (for example, a video camera, a smartphone, a tablet terminal, or the like).

The present disclosure is applicable to an imaging apparatus that performs image processing.

What is claimed is:

1. An imaging apparatus comprising:
   an image sensor configured to capture a subject image to generate original image data;
   an image processor configured to perform image processing to generate image data, the image processing providing the original image data with a predetermined effect;
   a storage configured to store a plurality of first parameter sets and at least one second parameter set, the plurality of first parameter sets each defining the effect in the image processing and the at least one second parameter set each defining a correspondence before and after color information in an image is converted; and
   a user interface configured to receive a user operation combining a first parameter set of the plurality of first parameter sets with a second parameter set of the at least one second parameter,
   wherein based on the user operation in the user interface, the image processor is configured to
      adjust an image indicated by the original image data, using the first parameter set included in the combination designated by the user operation, and
      convert color information included in the image adjusted by the first parameter set, using the second parameter set included in the designated combination, to generate the image data.

2. The imaging apparatus according to claim 1, further comprising an input interface,
   wherein the at least one second parameter set is stored in advance in the storage, or is acquired from an outside via the input interface and stored in the storage.

3. The imaging apparatus according to claim 1, further comprising a display configured to display information, wherein
   the user interface is configured to receive the user operation of designating, to one of the at least one second parameter set, a candidate of the first parameter set to be combined with the one second parameter set,
   the storage is configured to store the candidate designated by the user operation, and
   the display is configured to display information indicating the candidate when displaying information related to the one second parameter set.

4. The imaging apparatus according to claim 1, wherein the storage is configured to store a plurality of the combinations designated by the user operation,
   the user interface is configured to receive a user operation selecting one of the plurality of combinations, and
   when the one of the plurality of combinations is preselected before capturing of the original image data by the user operation received by the user interface, the image processor is configured to
      adjust the image indicated by the original image data using the first parameter set included in the preselected combination, and
      convert the color information included in the image adjusted by the first parameter set using the second parameter set included in the preselected combination to generate the image data.

5. The imaging apparatus according to claim 1, wherein at least one of a plurality of parameters constituting the first parameter set included in the combination is each configured to change by a user operation received via the user interface.

6. The imaging apparatus according to claim 1, further comprising a recorder configured to record the image data in a recording medium.

7. The imaging apparatus according to claim 1, further comprising a communication interface configured to transmit the image data to a communication network.

8. The imaging apparatus according to claim 1, wherein the second parameter set is a three-dimensional lookup table.

* * * * *